Feb. 11, 1930.                V. WOOD                1,746,296
        SYLPHON BELLOWS DETECTOR FOR SANITARY CAN TESTERS
                    Filed Oct. 19, 1928        2 Sheets-Sheet 1
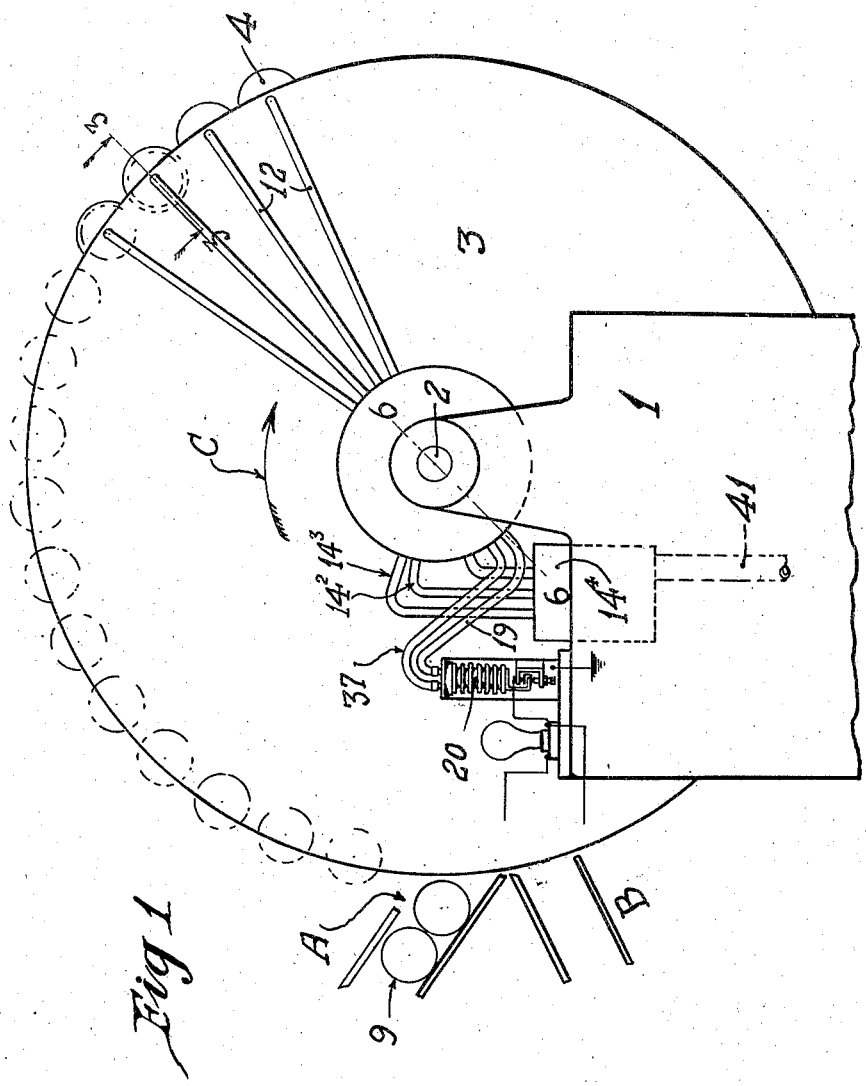
INVENTOR
Vernon Wood
BY
Harry A. Totten
ATTORNEY Feb. 11, 1930.   V. WOOD   1,746,296
SYLPHON BELLOWS DETECTOR FOR SANITARY CAN TESTERS
Filed Oct. 19, 1928   2 Sheets-Sheet 2
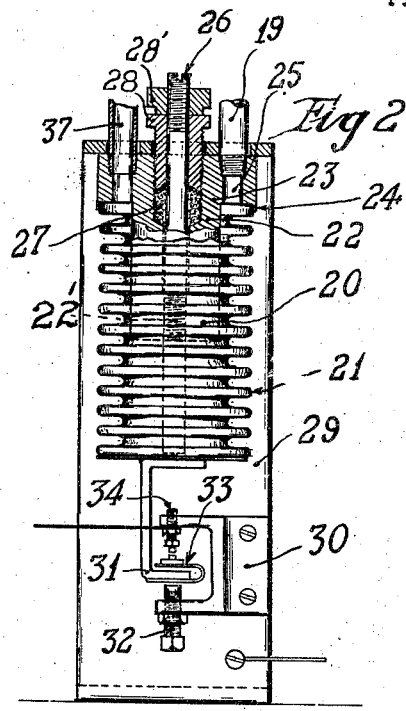
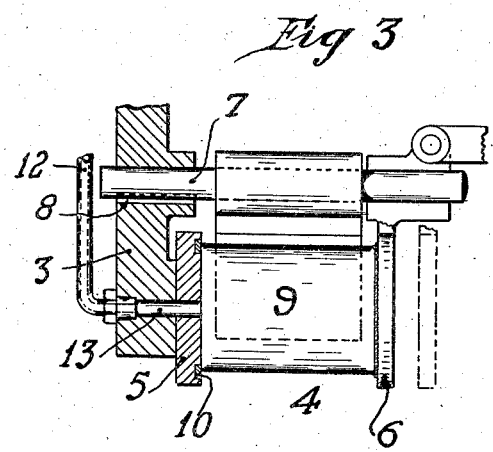
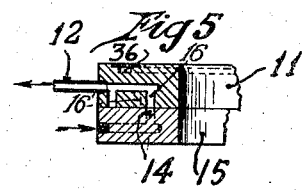
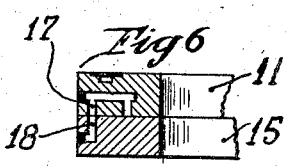
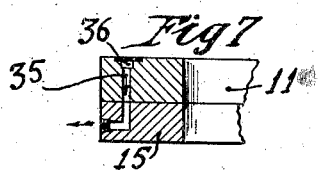
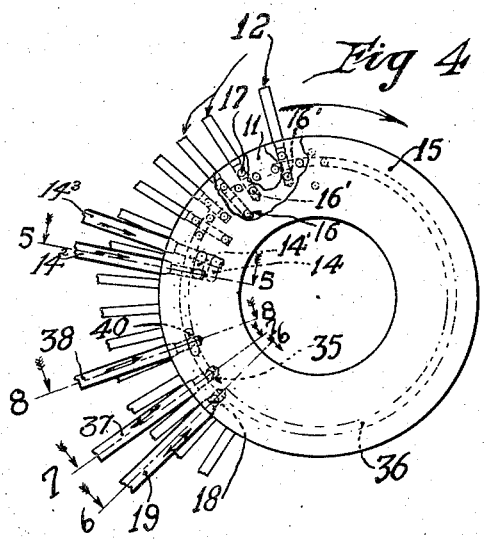
INVENTOR
Vernon Wood
BY
Harry A. Toffin
ATTORNEY Patented Feb. 11, 1930

1,746,296

UNITED STATES PATENT OFFICE

VERNON WOOD, OF LOS ANGELES, CALIFORNIA, ASSIGNOR TO AMERICAN CAN COMPANY, OF SAN FRANCISCO, CALIFORNIA, A CORPORATION OF NEW JERSEY

SYLPHON-BELLOWS DETECTOR FOR SANITARY CAN TESTERS

Application filed October 19, 1928. Serial No. 313,435.

The present invention relates to improvements in apparatus for testing cans to determine the leaky from the non-leaky, and more particularly to a form of leak detecting element which is particularly sensitive to differences in air pressures, which is simple in its construction and operation, and which is also comparatively free from repair and of adjustment after once being set.

The principal object of the invention is the provision, in cooperation with an air pressure can apparatus, of a one piece, closed, circumferentially bellowsed cylinder, which, due to its formation, is incapable of lateral expansion and contraction, and is free for lineal expansion and contraction on the application thereto of various internal pressures in the testing of cans.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

Referring to the drawings illustrating one embodiment of the invention—

Fig. 1 is a view in side elevation of a portion of a can testing apparatus with the preferred embodiment of my invention illustrated in connection therewith.

Fig. 2 is a view in vertical elevation of the bellows assembly, with the upper portion in section, and illustrating the electric circuit contacting device.

Fig. 3 is a view in detail section of one of the can holding devices, a plurality of which are disposed about the periphery of a tester wheel.

Fig. 4 is a view in detail elevation of the controlling air valve, consisting of superimposed ported valve discs, one rotatable relatively to the other.

Fig. 5 is a transverse section on line 5—5 of Fig. 4, illustrating the ports and channels registering to admit air to flow in the direction of the arrows from the supply to a can.

Fig. 6 is a transverse sectional view on line 6—6 of Fig. 4, with the valve discs in position to afford a connection between the can being tested and the controlling bellows.

Fig. 7 is a corresponding section taken on line 7—7 of Fig. 4, illustrating the valve disc in a position, with the ports and channels cooperating, to admit an air flow in the direction of the arrow, to restore the counter-balancing pressure in the bellows, should the same have dropped, due to a leaky can, or no can to test.

Fig. 8 is a similar section on line 8—8 of Fig. 4, illustrating the registration of the ports and channels in the valve rings to admit air from the storage tank to chamber in the rotating ring.

In presenting the present invention, only those parts of a can testing apparatus having direct connection with the present invention and essential in its description, arrangement and operation have been illustrated in the drawings, it being clearly apparent that those skilled in the can making art will readily comprehend the invention from the following description, taken in connection with the accompanying drawings, and thereby will be in a position to incorporate my present invention in can testers of the pressure type.

Referring to the drawings, disclosing the preferred embodiment of my invention, 1 includes a supporting base, mounting for rotation on a horizontal axis 2, a tester wheel 3.

Arranged about the periphery of the tester wheel is an endless series of can holding stations 4, each adapted to receive a can to be tested, as they successively pass the can feed station A, and each to discharge its tested can as they successively pass the can discharge station B. The testing wheel is rotated in the direction of the arrow C, Fig. 1, by any suitable mechanism, not shown.

For illustration in Fig. 3, each can testing station comprises a pair of oppositely disposed end plates 5 and 6, the former mounted on the face of the tester wheel 3, and the latter reciprocable on a supporting rod 7, extending laterally from the face of the wheel 3. One end of the rod is mounted in a bearing 8, disposed transversely of the tester wheel near its periphery.

Suitable mechanism, not shown, is provided for operating each testing station and plate 6 to move the same to and from its cooperating plate 5 in holding the can 9 during the testing operation.

Cans to be tested, open at one end, are delivered at station A to the successive can testing stations 4, as the same pass station A, with the open end of the can facing plate 5, Fig. 3, so that when the cans are clamped in testing position, their respective end walls will seat against the respective gaskets 10, the latter sealing the ends of the can for testing purposes.

Radiating from the rotatable ring 11 of the valve structure surrounding the axis 2, are the pipes 12, one communicating with each testing station 4, through a port 13 in the respective end plates 5.

The pipes are initially supplied with air under pressure after the testing stations 4 are successively supplied with cans on passing station A. This is accomplished when the ports 14 and 14' in stationary valve ring 15 register with ports 16 and 16' in the valve ring 11, one of which latter ports communicates with each of the pipes 12 within the ring 11. Valve rings 11 and 15 are disposed with their ported faces in frictional contact, and in actual practice are so constructed that air escape between them is negligible, and intercommunication between the respective pipes and ports is interrupted when the respective ports are out of register. Ports 14 and 14' connect respectively through pipes 14² and 14³ with an air reservoir 14⁴. Thus air under the same pressure is successively admitted into the cans 9 immediately after their ends are sealed by the gaskets 10. The cans thus charged with air under pressure are conveyed from station A to the point 6—6, Figs. 1 and 4, at which time ports 17 of pipes 12 successively register with port 18 in ring 15, Fig. 6, and which connects through pipe 19 with the interior of bellows 20, Figs. 1 and 2.

Bellows 20, Fig. 2, is a one piece metallic body of cylindrical construction, circumferentially bellowsed at 21, to preclude the same from expanding laterally, and at the same time to admit of its free lineal expansion and contraction.

Within the upper open end of bellows 20 is received the cylindrical bellows guide portion 22 of a block 23, and to a flange 24 of the block is secured the upper edge of the bellows. The guide occupies considerable space within the bellows, necessitating but little air to be admitted thereinto to cause its operation. Pipe 19 threads into the end of a channel 25 in block 23 and therethrough connects with the interior of bellows 20.

An adjusting screw 26 extends into bellows 20 through an opening disposed axially of the guide 22, it being threaded at 22' midway of its length into block 23. The adjustment of screw 26 limits the lineal contracting movement of bellows 20. Where the upper end of screw 26 passes through block 23 it is surrounded by a packing 27 adapted to be acted on by a gland 28 threaded into block 23. A bracket 29 carried by the base 1 mounts the block 23 and dependingly supports the bellows. A lock nut 28' holds the screw in its adjusted position. On the bracket 29 is a yoke 30, between the extensions of which lies the end of stirrup 31, the upper end of which is attached to the outer face of the lower end of the bellows 20.

The stirrup 31 is of relatively rigid construction and its lineal movement downwardly, occasioned by the expansion of bellows 20, is limited by the adjusting stop screw 32 carried by the yoke 30. The stirrup 31 carries a yieldable contacting member 33 adapted to engage on the contracting of bellows 20 with an adjustable contact point 34 on the upper extension of the yoke 30.

On the registration of the ports 17 of successive pipes 12 with the port 18 of pipe 19, the pressure in bellows 20, which is normally maintained at the same pressure as that within the cans 9 immediately after leaving station A, will be effected by a drop of pressure in the can, due to leakage or any other cause, and said pressure drop will release the pressure in bellows 20, and the construction of the same will cause its contraction. The contraction of the bellows is such as to complete an electric circuit or operate mechanism which will sort the leaky cans from the non-leaky as the same are discharged from the apparatus at the point B, which is slightly to one side of the line 6—6 of Figs. 1 and 4.

Immediately after registering with port 18 of pipe 19 to determine the leak in the can, if one exists, the successive pipes 12 register through ports 35 in ring 11, line 7—7, Fig. 4, which ports communicate with the annular channel 36 in ring 11, and through this connection convey through pipe 37, extending from the stationary ring 15, air under pressure to the bellows 20 to restore the pressure therein up to the normal initial charge pressure of the cans 9. Thus the bellows is in a position to determine, through pressure, a leaky from a non-leaky can presented by the next succeeding station 4.

Pipe 38 communicating through port 39 with ports 40 in annular channel 36, in movable ring 11, affords a supply of air under pressure at all times from reservoir 14⁴, the latter being supplied from any suitable source through pipe 41.

It is understood that at station A there is provided mechanism for moving successive plates 6 toward plates 5 to clamp cans between the same for the testing operation, and also that a mechanism is provided, as the can holding stations 4 approach discharge station B, to move plates 6 away from plates 5 to release the cans from stations 4.

The mechanism illustrated for sorting the leaky from the non-leaky cans as the same are discharged at the station B by the successive testing stations 4 registering therewith, is of any of the well known types, and since the same forms no part of the present invention, its construction has been dispensed with.

On the contraction of bellows 20 in detecting a leaky can as the same arrives at the station B, mechanism of any suitable form or type, forming no part of the present invention, is operated on the making of contacts 33 and 34, to direct a leaky can in a path different from the path of travel of non-leaky cans from said station.

By employing the bellows construction, Fig. 2, as a detecting chamber to determine the loss in pressure in successive cans, I provide an extremely sensitive and efficient unit, which is free from the troublesome diaphragm and piston constructions heretofore employed.

By circumferentially bellowsing the bellows forming body in parallel spaced planes, a structure is provided having a considerable length from end to end, the entire surface of which is free from movement on the expansion and contraction of the body, distributing the expansive and contractive forces over the entire area of the unit.

The present bellows construction is not susceptible to easy distortion, is capable of withstanding considerable internal pressure, and is adapted for expansion and contraction on slight variations of internal pressure therein.

I claim:—

1. In a detector for leaky cans comprising a plurality of can testing stations for receiving cans to be tested, means for supplying air under pressure to the interior of each can, a detector element comprising a closed cylindrical body circumferentially bellowsed in parallel spaced planes providing a chamber, and free for lineal expansion and contraction, means for charging the interior of the bellows with air under pressure corresponding to that in the cans, means for causing a successive registering of the cans with the bellows at an interval of time after their initial charge with air, whereby a loss of pressure in a can lowers the pressure in the bellows to indicate a leaky can, and means for restoring a drop of pressure in the bellows after the same communicates with each can.

2. In a detector for leaky cans comprising a plurality of can testing stations for receiving cans to be tested, means for supplying air under pressure to the interior of each can, a detector element comprising a closed cylindrical body circumferentially bellowsed in parallel spaced planes providing a chamber, means for mounting the bellows at one end to permit its free expansion and contraction for the remainder of its length, means for limiting the expansion and contraction of the bellows within predetermined limits, means for charging the interior of the bellows with air under pressure corresponding to that in the cans, means for causing a successive registering of the cans with the bellows at an interval of time after their initial charge with air, whereby a loss of pressure in a can lowers the pressure in the bellows to indicate a leaky can, and means for restoring a drop of pressure in the bellows after the same communicates with each can.

3. In a detector for leaky cans comprising a plurality of can testing stations for receiving cans to be tested, means for supplying air under pressure to the interior of each can, a detector element comprising a closed cylindrical body circumferentially bellowsed in parallel spaced planes providing a chamber, means for mounting the bellows at one end to permit its free expansion and contraction for the remainder of its length, an adjustable stop for limiting the expansion of the bellows, and a second adjustable stop for limiting the contraction of the bellows, means for charging the interior of the bellows with air under pressure corresponding to that in the cans, means for causing a successive registering of the cans with the bellows at an interval of time after their initial charge with air, whereby a loss of pressure in a can lowers the pressure in the bellows to indicate a leaky can, and means for restoring a drop of pressure in the bellows after the same communicates with each can.

In testimony whereof I have signed my name to this specification.

VERNON WOOD.